United States Patent
Horng et al.

(10) Patent No.: US 7,070,336 B2
(45) Date of Patent: Jul. 4, 2006

(54) BEARING POSITIONING MEMBER FOR A SPINDLE MOTOR

(75) Inventors: Alex Horng, Kaohsiung (TW);
Yin-Rong Horng, Kaohsiung (TW);
Ching-Sheng Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 313 days.

(21) Appl. No.: 10/436,091

(22) Filed: May 13, 2003

(65) Prior Publication Data

US 2004/0228559 A1    Nov. 18, 2004

(51) Int. Cl.
*F16C 25/06*   (2006.01)
*F15F 1/22*    (2006.01)

(52) U.S. Cl. .................... 384/517; 267/162; 384/563

(58) Field of Classification Search ............... 384/517, 384/518, 563; 267/161–165, 166.1, 158, 267/160, 179; 360/99.08, 98.07; 417/423.12, 417/423.13; 310/90
See application file for complete search history.

(56) References Cited

U.S. PATENT DOCUMENTS

| | | | | |
|---|---|---|---|---|
| 3,932,930 A | * | 1/1976 | Dochterman | 310/90 |
| 4,634,908 A | * | 1/1987 | Sturm | 310/64 |
| 5,000,589 A | * | 3/1991 | Ogata et al. | 384/517 |
| 5,274,289 A | * | 12/1993 | Wrobel | 384/261 |
| 5,483,113 A | * | 1/1996 | Sakuragi et al. | 310/90 |
| 5,982,064 A | * | 11/1999 | Umeda et al. | 310/90 |
| 6,382,606 B1 | * | 5/2002 | Horng | 267/161 |
| 6,511,303 B1 | * | 1/2003 | Obara | 417/423.12 |

* cited by examiner

*Primary Examiner*—Thomas R. Hannon
(74) *Attorney, Agent, or Firm*—Bacon & Thomas, PLLC

(57) ABSTRACT

A conic bearing positioning member for a spindle motor includes a small diameter portion abutting against an inner race of a ball bearing of the spindle motor, a large diameter portion abutting against a rotor of the spindle motor, and at least one resilient connecting portion extending between the small diameter portion and the large diameter portion for biasing the ball bearing and the rotor away from each other, assuring a gap between the ball bearing and the rotor. The conic bearing positioning member may be a helical spring.

30 Claims, 6 Drawing Sheets

BEARING POSITIONING MEMBER FOR A SPINDLE MOTOR

BACKGROUND OF THE INVENTION

1. Field of the Invention

The present invention relates to a bearing positioning member for a spindle motor.

2. Description of Related Art

A typical conventional bearing positioning member for a spindle motor or heat dissipating fan is disclosed in, as shown in FIG. 9. The motor includes a washer 101, a compression spring 102 that is substantially cylindrical, a retainer 21, and a positioning sleeve 301. The washer 101 and the compression spring 102 are mounted between a rotor 10 and a ball bearing 20. The retainer 21 is mounted to a bottom of another ball bearing 20', and the positioning sleeve 301 is tightly engaged with an inner periphery of an axle tube 30. When the rotor 10 moves axially toward the bearing 20 during operation, the compression spring 102 exerts a force to the rotor 10, assuring a gap between the rotor 10 and the bearing 20. The positioning sleeve 301 maintains the fixed positional relationship between the two bearings 20 and 20' in the axle tube 30 and absorbs the vibrations generated during operation to thereby reduce noise.

Since the washer 101 and the compression spring 102 having a simple structure and a low cost, they are widely used in spindle motors and heat dissipating fans. However, the compression spring 102 supports the rotor 10 by a small area and thus fails to provide a reliable, stable support for the rotor 10. Further, the axial compression of the compression spring 102 is limited, as the coils of the compression spring 102 are stacked upon one another in the axial direction. Further, the coils of the compression spring 102 that are stacked upon one another and press against one another often cause distortion and deformation of the compression spring 102 in the radial direction while the compression spring 102 is compressed. Further, when the rotor 10 turns, the washer 101 that is in contact with an inner race 20a and the outer race 20b of the ball bearing 20 at the same time is apt to wear. Further, it is not easy to accurately mount the positioning sleeve 301 into the axle tube 30. Conclusively, the bearing positioning structure of this conventional motor could not meet the end of providing a balanced rotation for the rotor of a spindle motor.

OBJECTS OF THE INVENTION

The object of the present invention is to provide a conic resilient bearing positioning member for a spindle motor. The bearing positioning member is mounted between a rotor and a ball bearing of the spindle motor and includes a small diameter portion abutting against the ball bearing and a large diameter portion abutting against the rotor. Thus, the rotor and the ball bearing are biased away from each other under the action of the conic resilient bearing positioning member.

Another object of the present invention is to provide a conic resilient bearing positioning member for a spindle motor, wherein the small diameter portion of the bearing positioning member is punched to form a plurality of protrusions that are in contact with an outer end face of an inner race of the ball bearing, thereby reducing the friction loss by means of reducing the contact area between the bearing positioning member and the ball bearing.

A further object of the present invention is to provide a conic resilient bearing positioning member for a spindle motor, wherein the large diameter portion abuts against a bottom wall of a recessed portion of an inner side of the rotor. Radial outward movement of the large diameter portion of the bearing positioning member is prevented to thereby prevent the rotor from impinging the stator, prolonging the life of the spindle motor.

Still another object of the present invention is to provide a conic resilient bearing positioning member for a spindle motor, wherein an inner flange is formed on an inner periphery of an axle tube for securely receiving and accurately positioning at least one ball bearing.

SUMMARY OF THE INVENTION

In accordance with a first aspect of the invention, a conic bearing positioning member for a spindle motor is provided and includes:

a small diameter portion adapted to abut against an inner race of a ball bearing of the spindle motor;

a large diameter portion adapted to abut against a rotor of the spindle motor; and at least one resilient connecting portion extending between the small diameter portion and the large diameter portion for biasing the ball bearing and the rotor away from each other, assuring a gap between the ball bearing and the rotor.

In accordance with a second aspect of the invention, a bearing positioning member for a spindle motor is provided. The bearing positioning member is a helical spring having a smallest coil abutting against an inner race of a ball bearing of the spindle motor. The helical spring further has a largest coil abutting against an inner side of a rotor of the spindle motor.

In accordance with a third aspect of the invention, a spindle motor is provided and comprises:

a rotor having an inner side;

a ball bearing adapted to be mounted in an axle tube; and a conic bearing positioning member including a small diameter portion abutting against an inner race of the ball bearing, a large diameter portion abutting against the inner side of the rotor, and at least one resilient connecting portion extending between the small diameter portion and the large diameter portion for biasing the ball bearing and the rotor away from each other, assuring a gap between the ball bearing and the rotor.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
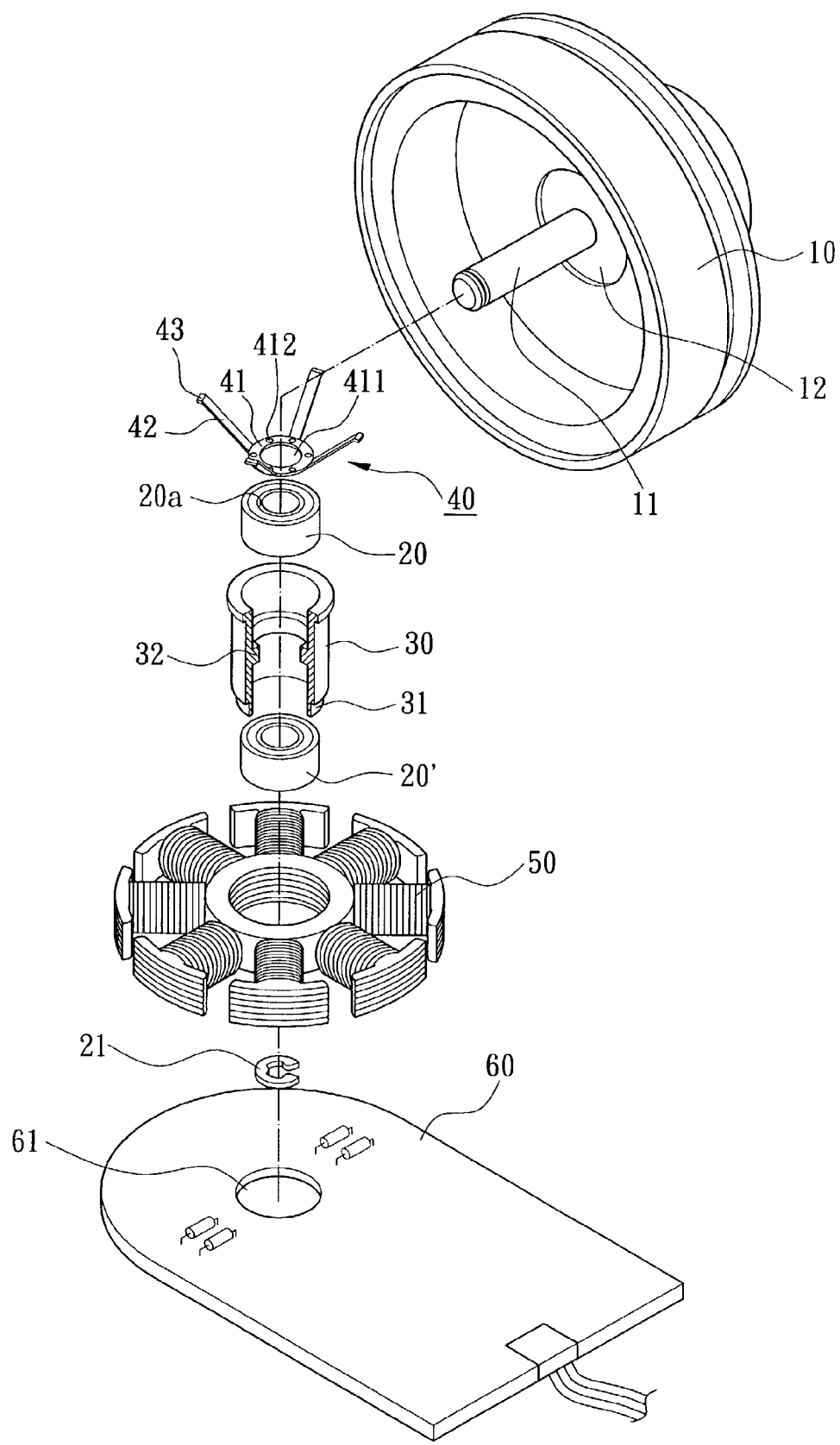
FIG. 1 is an exploded perspective view of a spindle motor with a bearing positioning member of a first embodiment in accordance with the present invention.
Figure 2:
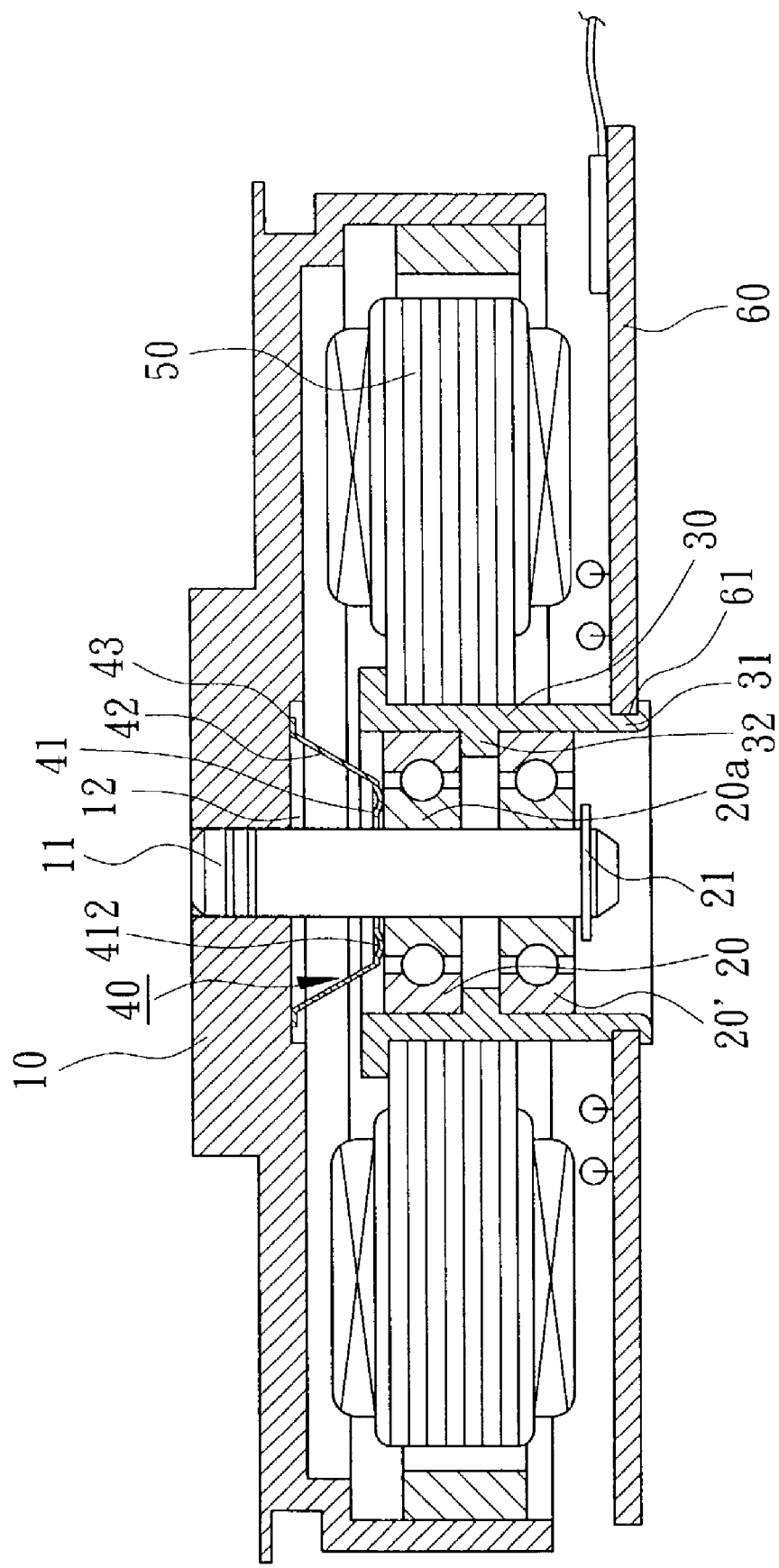
FIG. 2 is a sectional view of the spindle motor in FIG. 1.

FIGS. 1 and 2 illustrate a spindle motor with a bearing positioning member 40 of a first embodiment in accordance with the present invention. The bearing positioning member 40 is preferably conic and mounted between a rotor 10 and a ball bearing 20 of a spindle motor. The spindle motor further includes an axle tube 30, a stator assembly 50, and a circuit board 60. The bearing positioning member 40 is preferably made of a resilient material. Preferably, the bearing positioning member 40 is of a single piece and formed by means of punching a metal plate. In this embodiment, the bearing positioning member 40 includes a small diameter portion 41, a large diameter portion 43, a central hole 411 extending through the small diameter portion 41 and the large diameter portion 43, and at least one connecting portion 42 (four in this embodiment) extending between the small diameter portion 41 and the large diameter portion 43 for connecting the small diameter portion 41 and the large diameter portion 43 together. In this embodiment, the small diameter portion 43 is in the form of a ring, the connecting portions 42 are in the form of resilient legs 42 extending radially upward and outward from the small diameter portion 41 and spaced at angular intervals. The large diameter portion 43 includes a plurality of bent portions on the respective distal ends of the resilient legs 42. The central hole 411 allows a shaft 11 of the rotor 10 to extend therethrough. Further, the small diameter portion 41 includes a plurality of protrusions 412 formed thereon. Preferably, the protrusions 412 are formed by means of punching the small diameter portion 41.

Still referring to FIGS. 1 and 2, in assembly of the spindle motor, the stator 50 is mounted around an outer periphery of the axle tube 30. The axle tube 30 includes a deformable engaging portion 31 that is punched and thus engaged in an axial hole 61 in the circuit board 60. Two ball bearings 20 and 20' are mounted in the axle tube 30 are spaced apart by an inner flange 32 on an inner periphery of the axle tube 30. The shaft 11 of the rotor 10 is then extended through the ball bearings 20 and 20', with the conic bearing positioning member 40 being mounted between an outer end face of an inner race 20a of the ball bearing 20 and a bottom face of a recessed portion 12 defined in an inner side of the rotor 10. A retainer 21 is mounted to a distal end of the shaft 11 of the rotor 10.

As illustrated in FIG. 2, after assembly, the small diameter portion 41 (the ring) of the conic bearing positioning member 40 presses against the outer end face of the inner race 20a of the ball bearing 20 at the protrusions 412. Thus, the contact area between the ball bearing 20 and the bearing positioning member 40 is minimized to reduce the friction loss. The connecting portions 42 (the resilient legs) that connect the small diameter portion 41 to the large diameter portion 43 assures a gap between the rotor 10 and the ball bearing 20, thereby stably support the rotor 10 during operation. Since both the small diameter portion 41 and the large diameter portion 43 press against movable parts, the conic bearing positioning member 40 may rotate together with the rotor 10 and the inner race 20a of the ball bearing 20. Further, the conic bearing positioning member 40 can be compressed in the axial direction to an extent greater than that of the compression spring of the prior art. Thus, the vibrations of the rotor 10 during operation can be effectively absorbed, the noise generated during rotation of the rotor 10 is reduced, and the friction loss is reduced.

The recessed portion 12 of the rotor 10 may have a diameter slightly greater than that of the large diameter portion 43 of the conic bearing positioning member 40. Thus, when the rotor 10 moves axially relative to the stator 50, the large diameter portion 43 of the conic bearing positioning member 40 deforms and comes in contact with a peripheral wall of the recessed portion 12, avoiding further axial movement of the rotor 10 toward the stator 50 and avoiding damage to the parts of the spindle motor. The number of the resilient legs 40 and the number of the protrusions 412 can be selected according to the resiliency and the need.

Figure 3:
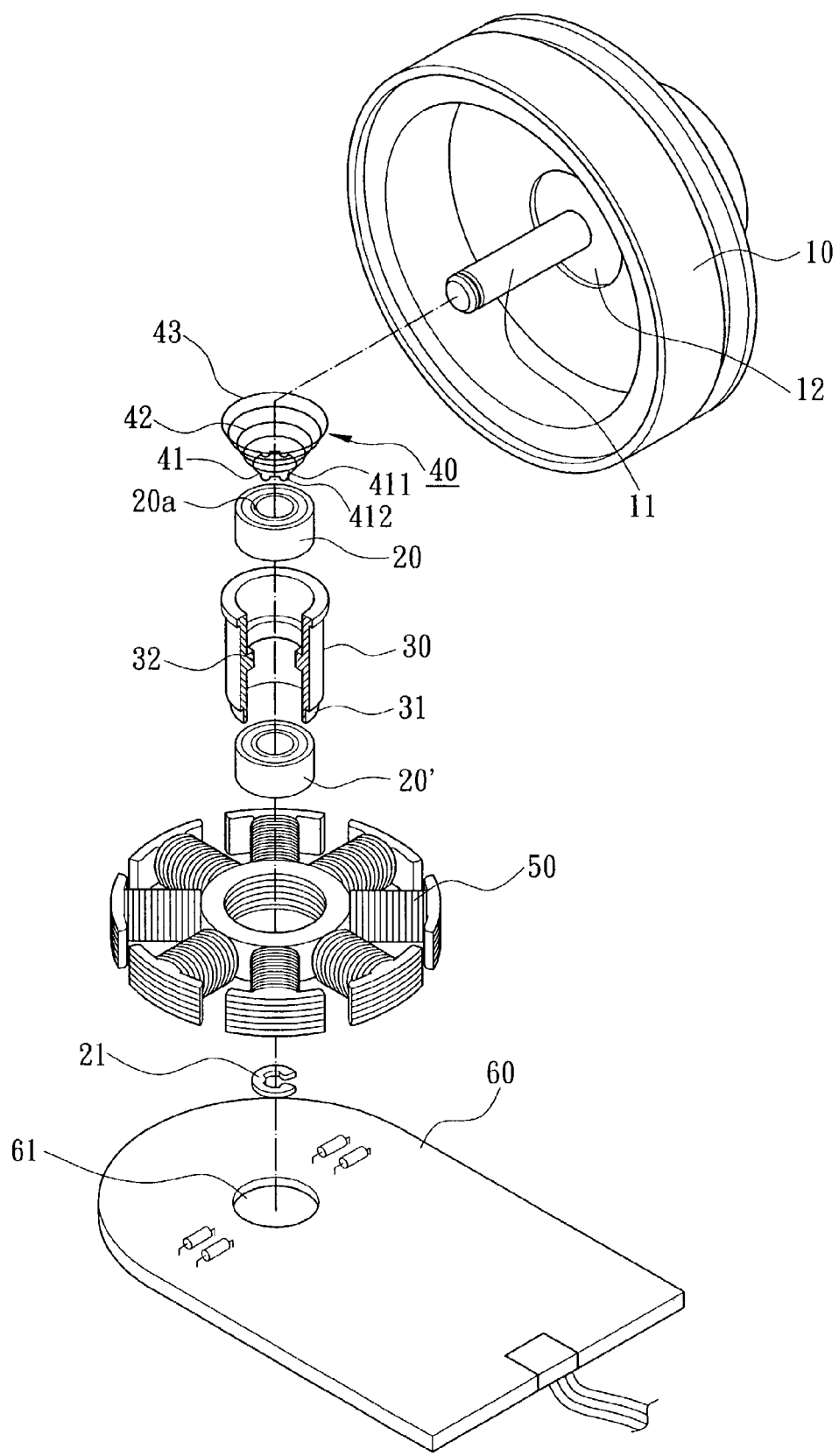
FIG. 3 is an exploded perspective view of a spindle motor with the bearing positioning member of a second embodiment in accordance with the present invention.
Figure 4:
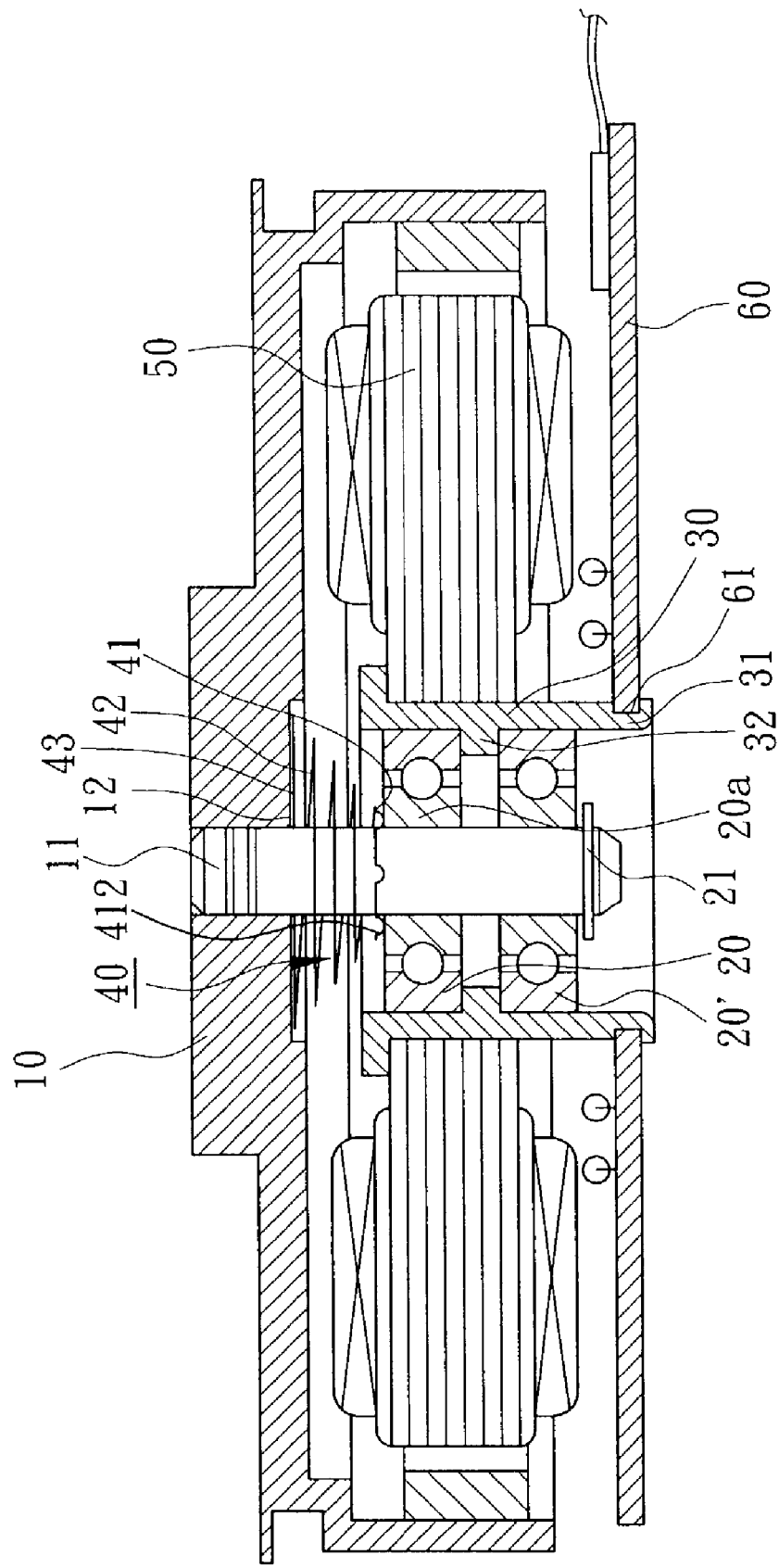
FIG. 4 is a sectional view of the spindle motor in FIG. 3.

FIGS. 3 and 4 illustrate a spindle motor with the conic bearing positioning member 40 of a second embodiment in accordance with the present invention. In this embodiment, the conic bearing positioning member 40 is in the form of a helical spring, with the small diameter portion 41 being formed by the smallest coil of the helical spring, with the protrusions 412 being formed by means of punching and bending the smallest coil, with the large diameter portion 43 being formed by the largest coil of the helical spring, with the connecting portions 42 being formed by the intermediate coils between the smallest coil and the largest coil of the helical spring.

Thus, the small diameter portion 41 (the smallest coil) of the conic bearing positioning member 40 presses against the outer end face of the inner race 20a of the ball bearing 20 at the protrusions 412. Thus, the contact area between the ball bearing 20 and the ball positioning member 40 is minimized to reduce the friction loss. The connecting portions 42 (the intermediate coil) assure a gap between the rotor 10 and the ball bearing 20, thereby stably support the rotor 10 during operation. The large diameter portion 43 (the largest coil) abuts against the bottom face of the recessed portion 12 of the rotor 10. Since both the small diameter portion 41 and the large diameter portion 43 press against movable parts, the conic bearing positioning member 40 may rotate together with the rotor 10 and the inner race 20a of the ball bearing 20. Further, the conic bearing positioning member 40 can be compressed in the axial direction to an extent greater than that of the compression spring of the prior art. Thus, the vibrations of the rotor 10 during operation can be effectively absorbed, the noise generated during rotation of the rotor 10 is reduced, and the friction loss is reduced. Since the conic bearing positioning member 40 is in the form of a helical spring that includes a plurality of coils having different diameters, the helical spring can be compressed in the axial direction to a greater extent without causing stacking and the resultant distortion and deformation.

Figure 5:
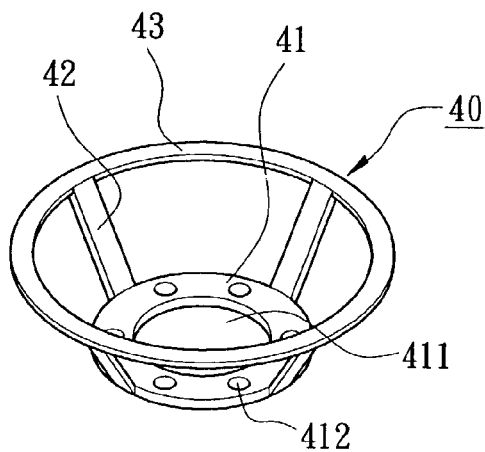
FIG. 5 is a perspective view of the bearing positioning member of a third embodiment in accordance with the present invention.
Figure 6:
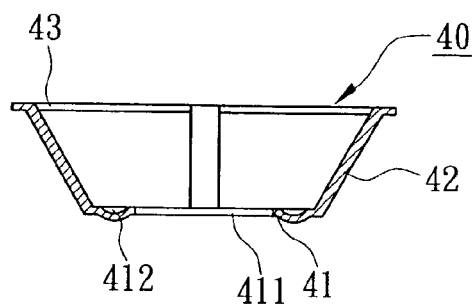
FIG. 6 is a sectional view of the bearing positioning member in FIG. 5.

FIGS. 5 and 6 illustrate the conic bearing positioning member 40 of a third embodiment in accordance with the present invention. In this embodiment, the large diameter portion 43 is in the form of a ring for more reliably supporting the rotor 10, absorbing the vibrations of the rotor 10, and reducing the noise.

Figure 7:
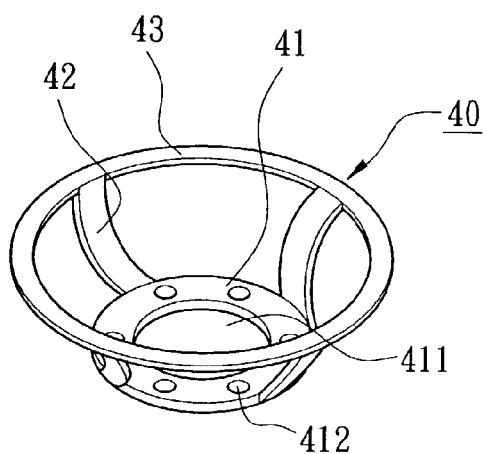
FIG. 7 is a perspective view of the bearing positioning member of a fourth embodiment in accordance with the present invention.
Figure 8:
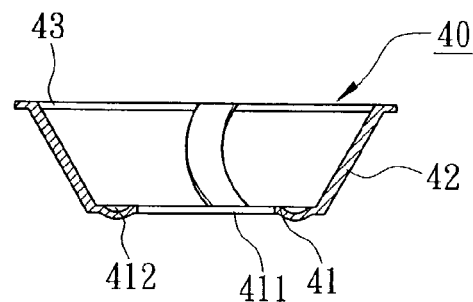
FIG. 8 is a sectional view of the bearing positioning member in FIG. 7.
Figure 9:
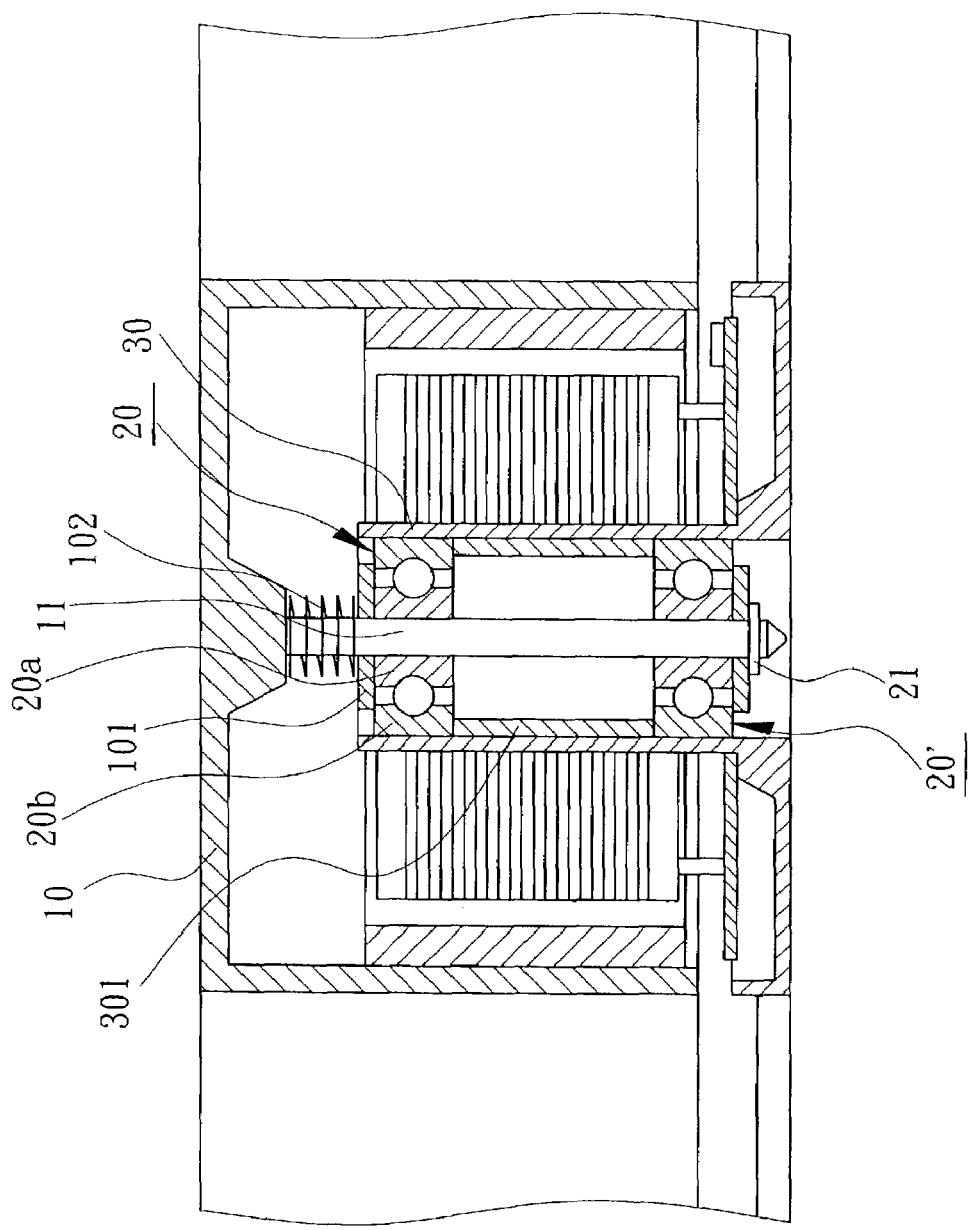
FIG. 9 is a sectional view of a conventional motor.

FIGS. 7 and 8 illustrate the conic bearing positioning member 40 of a fourth embodiment that is modified from the third embodiment. In this embodiment, the connecting portions 42 in the form of resilient legs are arcuate such that the overall length for the respective resilient leg is longer, thereby increasing the resiliency of the connecting portions 42.

According to the above description, the present invention provides a resilient conic bearing positioning member 40 between the rotor 10 and the ball bearing 20. The small diameter portion 41 (or the protrusions 412) of the conic bearing positioning member 40 presses against the inner race 20a of the ball bearing 20. The large diameter portion 43 of the conic bearing positioning member 40 reliably supports the rotor 10. The connecting portions 42 of various forms provide resiliency for assuring a gap between the rotor 10 and the stator 50. Further, the conic bearing positioning member 40 turns together with the rotor 10 and the inner race 20a of the ball bearing 20. Further, the conic bearing positioning member 40 can be compressed to a greater extent in the axial direction. Conclusively, the conic bearing positioning member 40 in accordance with the present invention improves the stability of assembling and positioning for the spindle motor. The vibration absorbing effect is improved, the noise is reduced, and the life of the spindle motor is prolonged.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A bearing positioning member for use in a spindle motor, comprising:
   a first portion provided with a plurality of protrusions adapted to abut against a ball bearing of the spindle motor;
   a second portion adapted to abut against a rotor of the spindle motor; and
   at least one resilient connecting portion extending between the first portion and the second portion for biasing the ball bearing and the rotor in opposite directions, assuring a gap between the ball bearing and the rotor.

2. The bearing positioning member as claimed in claim 1, wherein the first portion is a ring, said at least one connecting potion being a plurality of resilient legs extending radially upward and outward from the first ring, with each said resilient leg having a distal end that has a bent portion to form the second portion.

3. The bearing positioning member as claimed in claim 2, wherein each said resilient leg is arcuate.

4. The bearing positioning member as claimed in claim 2, wherein the first portion is punched to form the protrusion for contacting with the ball bearing, thereby reducing a contact area between the ball bearing and the first portion.

5. The bearing positioning member as claimed in claim 1, wherein the first portion is a first ring, the second portion being a second ring having a diameter greater than that of the first ring, said at least one connecting portion being a plurality of resilient legs extending radially upward and outward from the first ring, with each said resilient leg having a distal end connected to the second ring.

6. The bearing positioning member as claimed in claim 5, wherein each said resilient leg is arcuate.

7. The bearing positioning member as claimed in claim 5, wherein the first portion is punched to form the protrusion for contacting with the ball bearing, thereby reducing a contact area between the ball bearing and the first portion.

8. The bearing positioning member as claimed in claim 1, wherein the first portion is punched to form the protrusions for contacting with the ball bearing, thereby reducing a contact area between the ball bearing and the first portion.

9. The bearing positioning member as claimed in claim 1, wherein the bearing positioning member is a helical spring, with the first portion being the smallest coil of the helical spring, with the second portion being the largest coil for the helical spring, and with said at least one connecting portion being intermediate coils of the helical spring.

10. The bearing positioning member as claimed in claim 1, wherein the rotor includes a recessed portion on an inner side thereof, the recessed portion having a bottom wall against which the second portion abuts.

11. The bearing positioning member for use in a spindle motor, the bearing positioning member being a helical spring having a smallest coil provided with a plurality of protrusions adapted to abut against a ball bearing of the spindle motor, the helical spring further having a largest coil adapting to abut against an inner side of a rotor of the spindle motor.

12. A spindle motor comprising:
    a rotor having an inner side;
    a ball bearing adapted to be mounted in an axle tube; and
    a bearing positioning member including a first portion provided with a plurality of protrusions abutting against the inner side of the rotor, and at least one resilient connecting portion extending between the first portion and the second portion for biasing the ball bearing and the rotor in opposite directions, assuring a gap between the ball bearing and the rotor.

13. The spindle motor as claimed in claim 12, wherein the first portion is a ring, said at least one connecting potion being a plurality of resilient legs extending radially upward and outward from the first ring, with each said resilient leg having a distal end that has a bent portion to form the second portion.

14. The spindle motor as claimed in claim 13, wherein each said resilient leg is arcuate.

15. The spindle motor as claimed in claim 12, wherein the first portion is a first ring, the second portion being a second ring having a diameter greater than that of the first ring, said at least one connecting portion being a plurality of resilient legs extending radially upward and outward from the first ring, with each said resilient leg having a distal end connected to the second ring.

16. The spindle motor as claimed in claim 15, wherein each said resilient leg is arcuate.

17. The spindle motor as claimed in claim 12, wherein first portion is punched to form the protrusions for contacting with the ball bearing, thereby reducing a contact area between the ball bearing and the first portion.

18. The spindle motor as claimed in claim 12, wherein the inner side of the rotor includes a recessed portion having a bottom wall against which the second portion abuts.

19. The spindle motor as claimed in claim 12, wherein the axle tube has an inner flange for mounting and positioning the ball bearing.

20. A spindle motor comprising:
    a rotor having an inner side and a recessed portion provided thereon;
    a ball bearing adapted to be mounted in an axle tube; and
    a bearing positioning member including a first portion abutting against the ball bearing, a second portion received in the recessed portion for abutting against the inner side of the rotor, and at least one resilient connecting portion extending between the first portion and the second portion for biasing the ball bearing and the rotor in opposite directions, assuring a gap between the ball bearing and the rotor, wherein the first portion is a ring, and the connecting portion includes a plurality of resilient legs extending radially upward and outward from the ring, with each said resilient leg having a distal end that has bent portion to form the second portion.

21. The spindle motor as claimed in claim 20, wherein each said resilient leg is arcuate.

22. The spindle motor as claimed in claim 20, wherein the axle tube has an inner flange for mounting and positioning the ball bearing.

23. The spindle motor as claimed in claim 20, wherein the recessed portion of the rotor has a diameter slightly greater than that of the second portion of the bearing positioning member.

24. A spindle motor, comprising:
   a rotor having an inner side and a recessed portion provided thereon;
   a ball bearing adapted to be mounted in an axle tube; and
   a bearing positioning member including a first portion abutting against the ball bearing, a second portion received in the recessed portion for abutting against the inner side of the rotor, and at least one resilient connecting portion extending between the first portion and the second portion for biasing the ball bearing and the rotor in opposite directions, assuring a gap between the ball bearing and the rotor, wherein the first portion is a first ring, the second portion is a second ring having a diameter greater than that of the first ring, and said at least one connecting portion includes a plurality of resilient legs extending radially upward and outward from the first ring, with each said resilient leg having a distal end connected to the second ring.

25. The spindle motor as claimed in claim 24, wherein each said resilient leg is arcuate.

26. The spindle motor as claimed in claim 24, wherein the axle tube has an inner flange for mounting and positioning the ball bearing.

27. The spindle motor as claimed in claim 24, wherein the recessed portion of the rotor has a diameter slightly greater than that of the second portion of the bearing positioning member.

28. A spindle motor, comprising:
   a rotor having an inner side and a recessed portion provided thereon;
   a ball bearing adapted to be mounted in an axle tube; and
   a bearing positioning member including a first portion abutting against the ball bearing, a second portion received in the recessed portion for abutting against the inner side of the rotor, and at least one resilient connecting portion extending between the first portion and the second portion for biasing the ball bearing and the rotor in opposite directions, assuring a gap between the ball bearing and the rotor, wherein the first portion is provided with a plurality of protrusions for contacting with the ball bearing, thereby reducing a contact area between the ball bearing and the first portion.

29. The spindle motor as claimed in claim 28, wherein the axle tube has an inner flange for mounting and positioning the ball bearing.

30. The spindle motor as claimed in claim 28, wherein the recessed portion of the rotor has a diameter slightly greater than that of the second portion of the bearing positioning member.

* * * * *